United States Patent [19]

Thompson, Jr.

[11] Patent Number: 4,742,643
[45] Date of Patent: May 10, 1988

[54] WATER HEATING AND DISTRIBUTION SYSTEM

[75] Inventor: James E. Thompson, Jr., Winter Haven, Fla.

[73] Assignee: Aquaheet, Inc., Dundee, Fla.

[21] Appl. No.: 873,844

[22] Filed: Jun. 10, 1986

Related U.S. Application Data

[63] Continuation of Ser. No. 808,678, Dec. 16, 1985, abandoned, which is a continuation of Ser. No. 678,379, Dec. 5, 1984, abandoned, which is a continuation of Ser. No. 452,321, Dec. 22, 1982, abandoned.

[51] Int. Cl.$^4$ .................. A01G 13/00; A47J 27/00
[52] U.S. Cl. .................................. 47/2; 126/389/391
[58] Field of Search .................. 126/350 R, 347, 389, 126/390–392, 109; 47/2; 122/367 R, 367 C

[56] References Cited

U.S. PATENT DOCUMENTS

| 365,759 | 6/1887 | Prox | 122/214 X |
|---|---|---|---|
| 1,758,941 | 5/1930 | Gibson | 47/2 X |
| 1,846,395 | 2/1932 | Huffaker | 47/2 |
| 2,154,002 | 4/1939 | Kerrick | 47/2 |
| 2,175,422 | 10/1939 | Yoshinake | 47/2 |
| 2,266,162 | 12/1941 | Carlton | 47/2 X |
| 3,055,144 | 9/1962 | Johnson | 47/2 |
| 3,236,453 | 2/1966 | Raymond | 126/350 A |
| 3,734,064 | 5/1973 | Lancilla et al. | 122/367 C |
| 4,085,543 | 4/1978 | Barnard | 47/2 |
| 4,449,485 | 5/1984 | Tan | 122/367 C |

*Primary Examiner*—Robert A. Hafer
*Assistant Examiner*—Danton D. DeMille
*Attorney, Agent, or Firm*—Duckworth, Allen, Dyer & Doppelt

[57] ABSTRACT

A water heating and distributing system for affording freeze protection to plants and trees characterized by its utilization of a helical conduit for transporting the water to be heated in close proximity to a burner whereby the water's temperature is raised about 20°–25° F. The system further includes a plurality of jet spray heads disposed downstream of the heater in close proximity to the plants and trees to be protected, whereby a relatively fine mist, or fog, of heated water is applied for freeze protection.

18 Claims, 1 Drawing Sheet

WATER HEATING AND DISTRIBUTION SYSTEM

This application is a continuation of application Ser. No. 808,678, filed Dec. 16, 1985, now abandoned, which is a continuation of application Ser. No. 678,379, filed Dec. 5, 1984, now abandoned, which is a continuation of application Ser. No. 452,321, filed Dec. 22, 1982, now abandoned.

BACKGROUND OF THE INVENTION

1. Field of the Invention

The present invention relates to a water heating and distributing system for freeze protection of plants and trees. The temperature of supplied water is raised about 20°–25° F. by passing the water through a unique water conduit means disposed within the interior of a heater means, and the heated water is then jet-sprayed into close proximity with the plants and/or trees to be protected.

2. Description of the Prior Art

The use of various water distribution systems for the purpose of protecting foliage from the effects of low temperatures is well known in the agricultural industry. In fact, even if the water is not heated, but is of a temperature above that of the air surrounding the foliage, protection to the plants will be afforded merely by the continuous application of water. Of course, it is also well known within the agricultural industry to utilize other means such as, for example, smudge pots and hot air blowers for protecting crops and trees.

It can be readily appreciated that the use of unheated water for protecting against the effects of low temperatures necessarily requires the application of extremely great volumes of water. Not only might this be quite expensive, but also such a protection scheme invariably lowers the water table and may have long range deleterious effects on the entire geographic area. In similar fashion, the use of smudge pots and heaters for raising the ambient temperature of air is quite expensive and relatively inefficient. Not only must the owner consider the ever-increasing cost of fuel, but also significant labor charges are associated with maintaining and positioning the heaters.

It is therefore not surprising that the agricultural industry has recognized the general desirability of providing means for heating the water supplied by existing irrigation systems as a means for improving the efficiency of water sprays for protecting against low temperatures.

One fairly recent system for supplying heated water to protect the foliage from the effects of low temperatures is presented in U.S. Pat. No. 4,085,543 to Barnard. However, relatively low volumes of water are capable of being heated by the system, and the system is constructed so that the water is heated to only about 70° F. U.S. Pat. No. 2,266,162, to Carlton also discloses an apparatus for heating water and conveying the heated water to remote points for underground release and at selected locations to saturate the ground in agricultural areas as a protection against frost and freezing. A boiler-like apparatus is taught for heating the water. The use of compressed hot air for heating spray water is disclosed in U.S. Pat. No. 661,898 to Tucker. Yet another such device is disclosed in U.S. Pat. No. 1,846,395, to Huffaker. Still other devices and systems for heating water and applying the water to foliage or low temperature protection are taught in U.S. Pat. Nos. 1,758,941, to Gibson 2,613,478, to Ringle 1,967,803, to Boland and 2,154,002, to Kerrick.

Other means for protecting against the effects of low temperature utilizing the application of unheated water or the appliction of heated air are disclosed in the following U.S. Pat. Nos. 1,111,993 to Carder, 1,375,221 to Lowe, 1,632,611 to Lloyd, 1,688,802 to Crowhurst, 2,164,011 to Hilborn, 2,350,621 to Kasser, 3,055,144 to Johnson, 3,354 579 to Gross, 3,755,961 to McIsaac.

Examples of analagous systems are also disclosed in French Patent Nos. 67,211 and 1,091,020.

Notwithstanding the proliferation of prior art devices for protecting against freeze damage in agricultural areas, actual use of devices such as those taught in the prior art reveals significant economic and practical limitations. In order to provide effective low temperature protection for large areas such as, for example, 50 or 60 acres, either multiple systems must be utilized in order to provide sufficient quantities of heated water, or extremely large and expensive—with particular regard to fuel costs—water heating devices must be utilized. It is therefore apparent that there is a great need in the art for a system which affords reliable protection against low temperature damage to plants and trees at a cost to the owner which is significantly below that required to maintain current, state-of-the-art systems.

SUMMARY OF THE INVENTION

The present invention relates to a water heating and distributing system of the type primarily used for protecting plants and/or trees from freezing temperatures. The system of this invention is characterized by its use of unique heater and water conduit means for raising the temperature of irrigation water 20°-25° F. and then distributing the water in a fine, mist-like pattern in close proximity to the foliage to be protected. Preferably, then, the heater and its associated water conduit means are installed intermediate the source of irrigation water and a jet spray distribution system.

In the preferred embodiment, and as is set forth in greater detail below, the heater means comprises an elongated enclosure which may be of substantially columnar configuration which is mounted at a suitable location in horizontal fashion with respect to the axis of the enclosure. A burner communicates with the interior of the enclosure, and the burner is preferably fueled by propane gas. However, it is to be understood that a particular fuel source is not required within the scope of the present invention. It has been found to be desirable to incorporate a fuel vaporizer intermediate the fuel tank and the burner assembly for the purpose of enhancing the efficiency of combustion. In the preferred embodiment, the heater means further comprises a controller which automatically regulates the intensity of the flame from the burner to insure proper, economical combustion of the fuel. The burner is placed with respect to the interior of the elongated enclosure so as to "shoot" the burner flame substantially axially through the enclosure.

The water heating and distributing system further comprises water inlet means communicating with the interior of the enclosure and water outlet means for removing heated water from the enclosure. The output of the water outlet means is then connected in fluid-communicating relation with water delivery means for misting the heated water into close proximity with the foliage to be protected.

Disposed intermediate the water inlet means and the water outlet means, and in fluid-communicating relation therebetween inside the heater body is a water conduit means comprising a helical coil through which the water passes. As the water passes through the helical coil, its temperature will be raised about 20°-25° F. when the burner is energized. Because this heated water is then dispersed in a fine, mist-like spray in close proximity to the foliage a protective "fog" is generated to protect the plants and/or trees from freezing.

Inasmuch as significant combustion takes place within the heater body, the system further comprises exhaust means for expelling the products of combustion. For the purpose of maximizing the transfer of heat from the burner flame to water flowing through the water conduit means, the exhaust means of this system comprises not only an exhaust aperture formed through the elongated enclosure, but also an exhaust conduit disposed within the enclosure in fluid communicating relation with the exhaust aperture and extending therefrom to define an open distal end in close proximity to the bottom of the enclosure. By virtue of this construction, maximum circulation of hot exhaust gases within the heater means is insured to increase the system's efficiency with respect to quantity of fuel consumed versus quantity of water heated.

It is also to be noted that both the water inlet means and the water outlet means comprise check valves for preventing backflow of water through the heater means. Furthermore, both the water inlet means and the water outlet means comprise an inlet elbow and an outlet elbow, respectively, whereby water is prevented from draining from the helical coil when the water supply is secured. This construction is desirable for the purpose of significantly reducing rust accumulations within the helical coil. The system of this invention further comprises the placement of insulation such as, for example, porcelain bats or poured refractory material, as a lining within the elongate enclosure of the heater body.

While, as indicated above, the heater body is of a tank-like construction, it is contemplated that the elongate enclosure may be formed from joined top and bottom halves. In this alternative construction, the cross-sectional configuration of the assembled enclosure could comprise, for example, a hexagon thus permitting its installation without the use of supporting legs or cradle structure. It is also contemplated that the controller of the burner means could be modified to include means for sensing and determining water flow through the helical coil for the purpose of securing the system if water pressure were lost.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which.

Similar reference characters refer to similar parts throughout the several views of the drawings.

DETAILED DESCRIPTION

Figure 1:
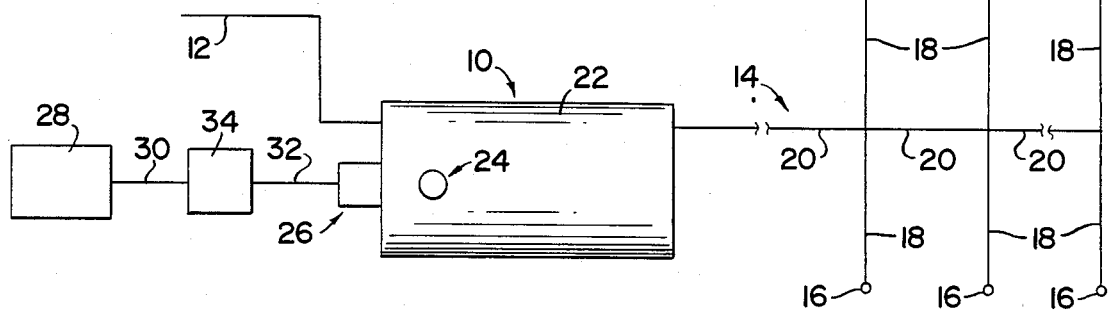
FIG. 1 is a schematic plan view of the water heating and distributing system.

The water heating and distributing system of the present invention is schematically illustrated in plan view in the view of FIG. 1. As shown therein, the heater means is generally designated at 10 and is disposed in interconnecting, fluid-communicating relation between a source conduit 12 for water and a heated water delivery means generally indicated as 14. Though forming no part of the invention, per se, it is to be understood that source conduit 12 receives water from any suitable supply such as, for example, a well. As will be described in greater detail below, source water passes from source conduit 12 through heater means 10 and is then applied in close proximity to plants and/or trees to be protected from low temperatures by the water delivery means 14.

With particular regard to water delivery means 14, it can be seen that a plurality of jet spray heads 16 receive and disperse a fine mist of heated water received through branch conduits 18 connected to the main delivery conduit 20.

Still with regard to the schematic representation of FIG. 1, it can be seen that heater means 10 comprises a heater body 22 and an exhaust means generally indicated as 24 communicating with the interior of body 22. A burner means generally indicated as 26 is at least partially disposed in body 22 whereby water flowing from source conduit 12 through heater means 10 and to delivery means 14 may be heated.

Fuel for burner means 26 is stored within fuel tank 28 and is supplied to burner means 26 through first fuel conduit 30 and second fuel conduit 32. As indicated in the view of FIG. 1, it has been determined to be advantgeous to interpose a fuel vaporizer/heater 34 intermediate the first fuel conduit 30 and the second fuel conduit 32 to enhance the efficiency of burner means 26.

Figure 2:
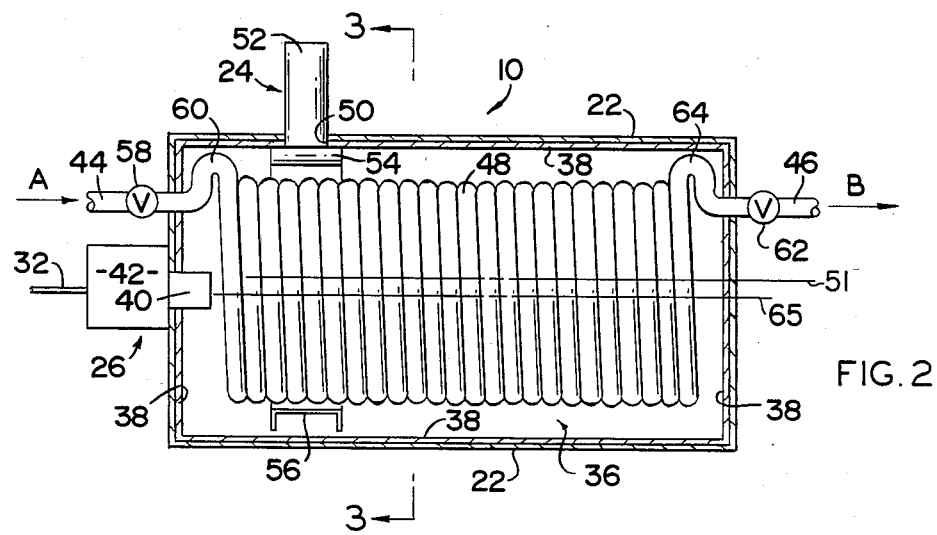
FIG. 2 is a sectional view of the heater means illustrating the water conduit means disposed within the heater body.
Figure 3:
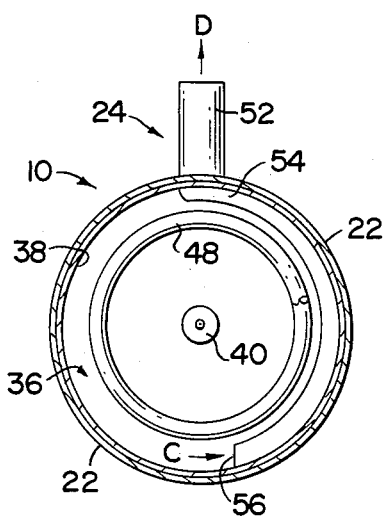
FIG. 3 is a sectional view taken along line 3—3 in FIG. 2.

Turning now to the partially sectioned view of FIG. 2 structural details of the system of this invention can be seen. As shown in the views of FIGS. 2 and 3, heater body 22 is of substantially columnar configuration and defines an elongate enclosure 36. The interior of heater body 22 is lined with insulation 38 which may comprise, for example, porcelain bats. The burner means 26 comprises a burner assembly 40 and controller 42 connected thereto for monitoring and regulating the operation of burner assembly 40. Burner assembly 40 is of the type which will, in effect, "shoot" the combustion flame axially through elongate enclosure 36.

Still with regard to the veiw of FIG. 2, the water heating and distributing system of this invention further comprises water inlet means 44 disposed in fluid-communicating relation with a source of water as indicated by directional arrow A and in communicating relation with the interior of elongate enclosure 36. In similar fashion, a water outlet means 46 is provided downstream of the water inlet means 44 in fluid-communicating relation to heated water delivery means 14 as indicated by directional arrow B. A water conduit means comprising a helical coil 48 is disposed in fluid-communicating relation between the water inlet means 44 and the water outlet means 46 inside elongate enclosure 36. As water passes through helical coil 48 its temperature will be raised by the effect of burner assembly 40, and the heated water passes through outlet means 46 to the delivery means 14.

In order to maximize the transfer of heat from the flame of burner assembly 40 to the water flowing through helical coil 48, exhaust means 24 comprises an exhaust aperture 50 formed through heater body 22 and insulation 38 to communicate with the interior of elongate enclosure 36. It is to be noted that exhaust aperture 50 is preferably formed above the longitudinal axis 51 of helical coil 48, and an exhaust stack 52 extends upwardly therefrom. The exhaust means 24 further comprises a baffle including an exhaust conduit 54 disposed within elongate enclosure 36 in fluid communicating relation with exhaust aperture 50 and extending therefrom to define an open distal end 56 disposed below the longitudinal axis of helical coil 48. This construction is most clearly seen in the sectional view of FIG. 3. Thus, exhaust gases from burner assembly 40 may not immediately exit from exhaust means 24, but are withdrawn from the bottom of elongate enclosure 36 thereby maximizing heat transfer. The entry of exhaust gases into open distal end 56 is indicated by directional arrow C in FIG. 3, and the ultimate delivery of those gases to the atmosphere is indicated by directional arrow D.

Returning to the view of FIG. 2, it can be seen that the preferred embodiment further comprises an inlet check valve 58 mounted within water inlet means 44 to prevent backflow of water from coil 48, and that the inlet means 44 further comprises an inlet elbow 60 between inlet check valve 58 and coil 48 to prevent water from draining from the coil 48 when the water supply is secured. In similar fashion, an outlet check valve 62 is provided within water outlet means 46, and outlet means 46 also comprises an outlet elbow 64 to prevent water from draining from coil 48 when the water supply is secured. Thus, once filled inlet coil 48 will always contain water, and this has proven to be advantageous of the purpose of significantly reducing the formation of rust deposits within helical coil 48.

As perhaps best seen in the view of FIG. 3, helical coil 48 is disposed within elongate enclosure 36 such that the longitudinal axis 51 of coil 48 is above corresponding longitudinal axis 65 of elongate enclosure 36. That is to say, helical coil 48 is disposed relatively closer to the top of enclosure 36 than to the bottom. This positioning of helical coil 48 further enhances the efficiency of the system by taking advantage of the fact that relatively higher temperatures will be maintained in the upper regions of elongate enclosure 36.

Having thus set forth a preferred construction for the water heating and distributing system of this invention, attention is invited to the following details concerning a working installation of the invention. It is, however, to be remembered that the following details are provided with regard to a particular installation and are not intended to limit the scope of the invention in any way. In a prototype installation, water was provided from an 8 inch well into 6 inch conduit at 40 psi. The temperature of the water supply was about 70°-72° F. Approximately 348 feet of 6 inch conduit was coiled to form helical coil 48 and, once coiled, had an effective longitudinal dimension of about 13 feet. The height of the coil 48 was about 78 inches. Heater body 22 basically comprised a tank approximately 15 feet long and 8 feet in diameter. At a flow rate of about 50,000-60,000 gallons per hour, the temperature of the water was raised about 20°-25° F. as it passed through the heater means 10. This prototype installation was found to be adequate for protecting a 60 acre citrus grove from the effects of ambient temperatures well below freezing. Utilizing propane gas as the fuel for burner assembly 40, about Eight Hundred Dollars ($800.00) of fuel was consumed in one month of operation. By comparison, a conventional grove heater consumes about one gallon of fuel per hour with at least 35 conventional heaters required per acre of grove. In just 2 nights of operation at the rate of 5 hours each night, the fuel bill for protecting 60 acres would exceed Eighteen Thousand Dollars ($18,000.00).

While a comparison of fuel costs alone readily demonstrates a primary advantage of the system of this invention over current grove heaters, other factors also should be noted. The prototype installation, serving to protect a 60 acre grove can be operated by just one person resulting in even greater economy for the grove owner. Water delivered by the prototype system was at such an elevated temperature that a warm fog cloud covered the 60 acre block acting like a blanket to retain heat around the trees.

Figure 4:
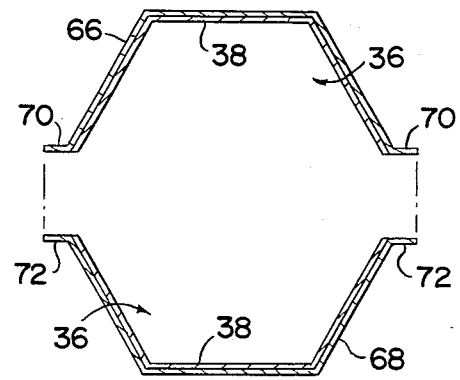
FIG. 4 is an exploded, sectional view similar to that of FIG. 3 illustrating an alternative embodiment for the heater body.

The view of FIG. 4 depicts an alternate embodiment for elongate enclosure 36 comprising top enclosure half 66 and bottom enclosure half 68. Top ledges 70 would be joined to bottom ledges 72 as by bolts (not shown) or other suitable fastening means to define an elongate enclosure 36 of hexagonal cross-section. Of course, insulation 38 is provided within the interior of top enclosure half 66 and bottom enclosure half 68. In this embodiment, insulation 38 could comprise, for example, porcelain bats as above, or poured refractory material could be utilized. The benefits of a construction such as that shown in FIG. 4 basically involve ease of manufacture and installation. It is to be understood that the construction of the system shown in FIGS. 1-3 could also utilize a two-part heater body 22, and the scope of this invention is not to be limited by the cross-sectional configuration of heater means 10.

It is further contemplated that return water conduits could be incorporated into the system for the purpose of recirculating water from the area being protected around jet spray heads 16 back to the helical coil 48. In analogous fashion, it might also prove advantageous to direct the exhaust gases from stack 52 either to first fuel conduit 30 or fuel vaporizer/heater 34 for the purpose of maximizing heat utilization derived from the combustion of fuel by burner assembly 40.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, what is claimed is:

1. A water heating and distributing system for freeze protection of vegetation, said system comprising:

an elongated enclosure disposed with its longitudinal axis in horizontal position;

water inlet means for introducing water from a water source into the interior of said enclosure;

water outlet means for removing water from the interior of said enclosure;

water conduit means, comprising a helical coil with a longitudinal axis disposed in horizontal position within said enclosure above the longitudinal axis of said enclosure, for transporting water from said water inlet means to said water outlet means;

burner means, in communication with the interior of said enclosure, for shooting a flame substantially axially through said helical coil to heat water transported through said coil;

an exhaust aperture formed through said elongated enclosure above the longitudinal axis of said coil;

a baffle comprising an exhaust conduit disposed within said enclosure in fluid communicating relationship with said exhaust aperture and extending therefrom around said coil to define an open distal end below the longitudinal axis of said coil; and means for generating a protective fog, comprising water delivery means connected downstream of said water outlet means for misting the heated water from said coil through a multiplicity of discharge ports into close proximity with the vegetation to be protected.

2. A system as in claim 1, wherein said water inlet means comprises an extension of said coil passing through one end said enclosure at the top of one end of said coil, and said water outlet means comprises an extension of said coil passing through the other end of said enclosure at the top of the other end of said coil.

3. A system as in claim 2, further comprising a first upwardly extending elbow connected between said water inlet means and said one end of said coil, and a second upwardly extending elbow connected between said water outlet means and said other end of said coil.

4. A system as in claim 3, wherein said burner means comprises a burner assembly mounted on one end of said enclosure and a fuel vaporizer connected to deliver fuel from a fuel source to said burner assembly.

5. A system as in claim 1, wherein said enclosure has a substantially columnar configuration.

6. A system as in claim 2, wherein said enclosure is lined with insulation in the form of procelain batts.

7. A system as in claim 1, wherein said enclosure has a hexagonal cross-section and comprises a top enclosure half and a bottom enclosure half joined together.

8. A system as in claim 1, wherein said water delivery means comprises a plurality of jet sprayheads.

9. A system as in claim 8, wherein said burner means further comprises means for raising the temperature of said water by 20°-25° F. as it passes through said coil.

10. A system as in claim 8, wherein said burner means further comprises means for heating said water to 90°-97° F. as it passes through said coil.

11. A system as in claim 1, wherein said burner means includes a controller operatively connected thereto for monitoring and regulating the operation of said burner means.

12. A system as in claim 1, wherein means is provided for receiving water at said water inlet means at a pressure of about 40 psi.

13. A system as in claim 12, wherein said helical coil composes a conduit having an inside diameter of about 6 inches and a length of 345-355 feet.

14. A system as in claim 1, wherein said burner means will suply sufficient heat to raise the water's temperature about 20°-25° F. at a flow rate of about 50,000-60,000 gallons per hour.

15. A system as in claim 2, wherein each of said water inlet means and said water outlet means further comprises a checkvalve to prevent backflow of water.

16. A system as in claim 15, further comprising a first upwardly extending elbow connected between said water inlet means and said one end of said coil, and a second upwardly extending elbow connected between said water outlet means and said other end of said coil.

17. A system as in claim 1, wherein said burner means comprises a burner assembly mounted on one end of said enclosure, and a fuel vaporizer connected to deliver fuel from a fuel source to said burner assembly.

18. A system as in claim 1, wherein the longitudinal axis of said coil is disposed above the longitudinal axis of said enclosure.

* * * * *